United States Patent
Pan

(10) Patent No.: US 6,442,002 B1
(45) Date of Patent: Aug. 27, 2002

(54) STACKABLE, INTERLOCKING MOUNTING SUPPORTS FOR DATA STORAGE ACTUATOR ARM

(75) Inventor: Tzong-Shii Pan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,884

(22) Filed: Feb. 11, 2000

(51) Int. Cl.$^7$ ................................................ G11B 21/18
(52) U.S. Cl. .................................... 360/266.1; 360/266
(58) Field of Search ........................... 360/266.1, 265.9, 360/266, 244.8, 244.9, 245, 245.1, 245.2, 245.3, 245.4, 245.5, 245.6, 245.7; 29/630.04

(56) References Cited

U.S. PATENT DOCUMENTS

| | | | |
|---|---|---|---|
| 4,352,133 A | 9/1982 | Hager | |
| 4,843,503 A | 6/1989 | Hazebrouck et al. | |
| 5,291,360 A | 3/1994 | Foote | |
| 5,512,725 A | 4/1996 | Kelemen et al. | |
| 5,629,820 A | 5/1997 | Koriyama | |
| 5,828,521 A | 10/1998 | Hasegawa | |
| 5,844,754 A | 12/1998 | Stefansky et al. | |
| 5,862,019 A | 1/1999 | Larson | |
| 6,014,289 A | * 1/2000 | Goss | 360/244.1 |
| 6,046,883 A | * 4/2000 | Miller | 360/245.7 |
| 6,067,209 A | * 5/2000 | Aoyagi et al. | 360/245.7 |
| 6,088,201 A | * 7/2000 | Kazama | 360/244.2 |
| 6,144,531 A | * 11/2000 | Sawai | 360/245.1 |
| 6,166,886 A | * 12/2000 | Toensing | 360/245.1 |
| 6,233,121 B1 | * 5/2001 | Pan | 360/245.7 |

FOREIGN PATENT DOCUMENTS

| | | |
|---|---|---|
| JP | 36-1122974 A | 6/1986 |
| JP | 62-80884 | 4/1987 |
| JP | 401315074 A | 12/1989 |
| JP | 8-167190 | * 6/1996 |

* cited by examiner

Primary Examiner—Brian E. Miller
Assistant Examiner—Tianjie Chen
(74) Attorney, Agent, or Firm—Robert B. Martin; Bracewell & Patterson, L.L.P.

(57) ABSTRACT

A hard disk drive has a rotatable disk and an actuator arm that pivots relative to the disk. The arm has a cantilevered mounting support with a suspension extending therefrom. A head gimbal assembly is secured to the suspension for reading/writing data to the disk. The mounting support is a two-piece design with a pair of virtually identical support elements. The distal end of each support element has an aperture with a tab that protrudes into the aperture. The tabs extend in opposite directions. The support elements mount on top of each other in a matching alignment configuration. The proximal ends of the support elements closely receive a pivot assembly to secure them from relative movement. On the distal ends, the apertures of the support elements substantially align such that their tabs precise engage each other in an interference fit. The interlocking tabs and tight fitting pivot assembly combine structurally to give the assembled mounting support enhanced bending, torsional stiffness, and shock resistance.

13 Claims, 4 Drawing Sheets

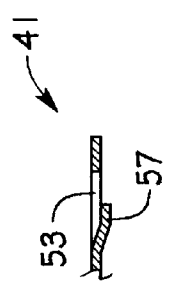
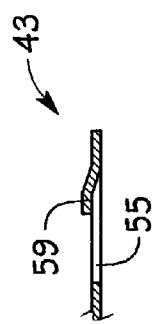
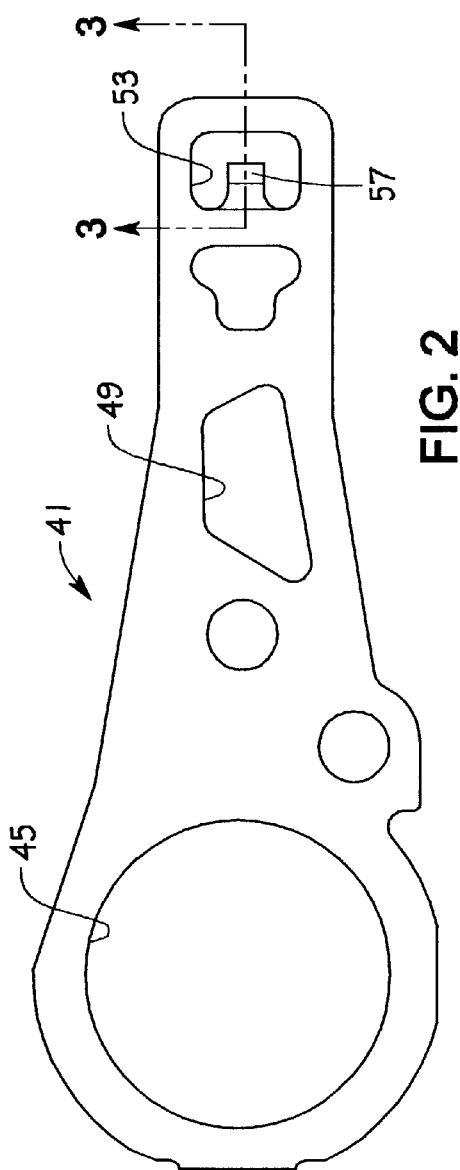
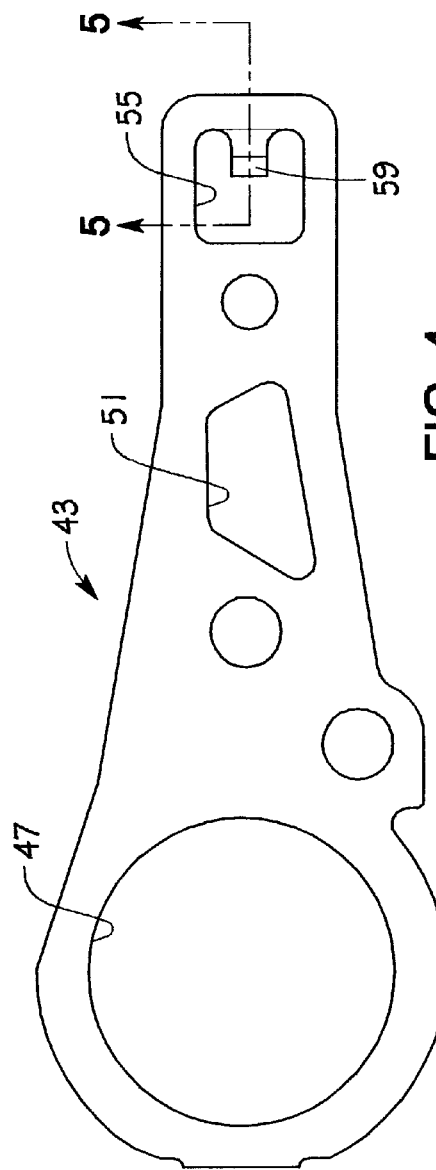

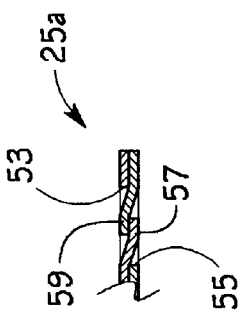
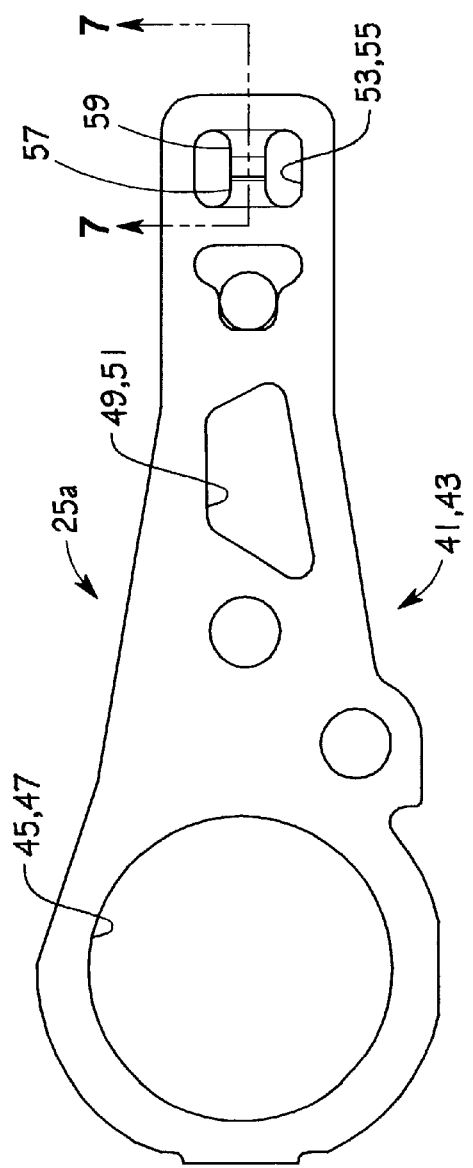

US 6,442,002 B1

STACKABLE, INTERLOCKING MOUNTING SUPPORTS FOR DATA STORAGE ACTUATOR ARM

BACKGROUND OF THE INVENTION

1. Technical Field:

This invention relates in general to an improved data access and storage device, and in particular to an improved actuator arm for a disk drive. Still more particularly, the invention relates to a system and method for improving the bending, torsional stiffness, and shock resistance of a disk drive actuator arm.

2. Description of the Prior Art:

Generally, a data access and storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head stack assembly. Within most drives, one read/write head is associated with each side of each platter and flies just above or below the platter's surface. Each read/write head is mounted on a suspension to form a head gimbal assembly (HGA). The HGA is then attached to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

As the demand for storage capacity of disk drives continues to increase, more disks are being put in the same size form factor, and the heads are required to read and write in smaller areas on the disks. In addition, the dynamic performance of the mechanical components also must be improved to accommodate the aggressive increase in the track density and the reduction in disk-to-disk spacing. The mass/inertia of the actuator is a particularly important parameter for improving the seek time and reducing power consumption. The actuator arm is the most significant contributor to the actuator mass/inertia. The most effective way to reduce the mass/inertia of the actuator arm is to reduce its thickness. Unfortunately, reducing the thickness of the actuator arm also has the adverse effects of decreasing the arm's stiffness, bending and torsional resonance, and shock resistance. Thus, an improved data access and storage device actuator arm is needed.

SUMMARY OF THE INVENTION

A hard disk drive has a rotatable disk and an actuator arm that pivots relative to the disk. The arm has a cantilevered mounting support with a suspension extending therefrom. A head gimbal assembly is secured to the suspension for reading/writing data to the disk. The mounting support is a two-piece design with a pair of virtually identical support elements. The distal end of each support element has an aperture with a tab that protrudes into the aperture. The tabs extend in opposite directions.

The support elements mount on top of each other in a matching alignment configuration. The proximal ends of the support elements closely receive a pivot assembly to secure them from relative movement. On the distal ends, the apertures of the support elements substantially align such that their tabs precise engage each other in an interference fit. The interlocking tabs and tight fitting pivot assembly combine structurally to give the assembled mounting support enhanced bending, torsional stiffness, and shock resistance.

Accordingly, it is an object of the present invention to provide an improved digital access and storage device.

It is an additional object of the present invention to provide an improved actuator arm for a disk drive.

Still another object of the present invention is to provide a system and method for improving the bending, torsional stiffness, and shock resistance of a disk drive actuator arm.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 2 is an enlarged plan view of a first embodiment of a first element of the arm of FIG. 1.

FIG. 3 is a sectional side view of one end of the first element of FIG. 2 taken along the line 3—3 of FIG. 2.

FIG. 4 is an enlarged plan view of a first embodiment of a second element of the arm of FIG. 1.

FIG. 5 is a sectional side view of one end of the second element of FIG. 4 taken along the line 5—5 of FIG. 4.

FIG. 6 is an enlarged plan view of an assembly of the first element of FIG. 3 and the second element of FIG. 4.

FIG. 7 is a sectional side view of one end of the assembly of the first and second elements of FIG. 6 taken along the line 7—7 of FIG. 6.

DETAILED DESCRIPTION OF THE PREFERRED EMBODIMENT

Figure 1:
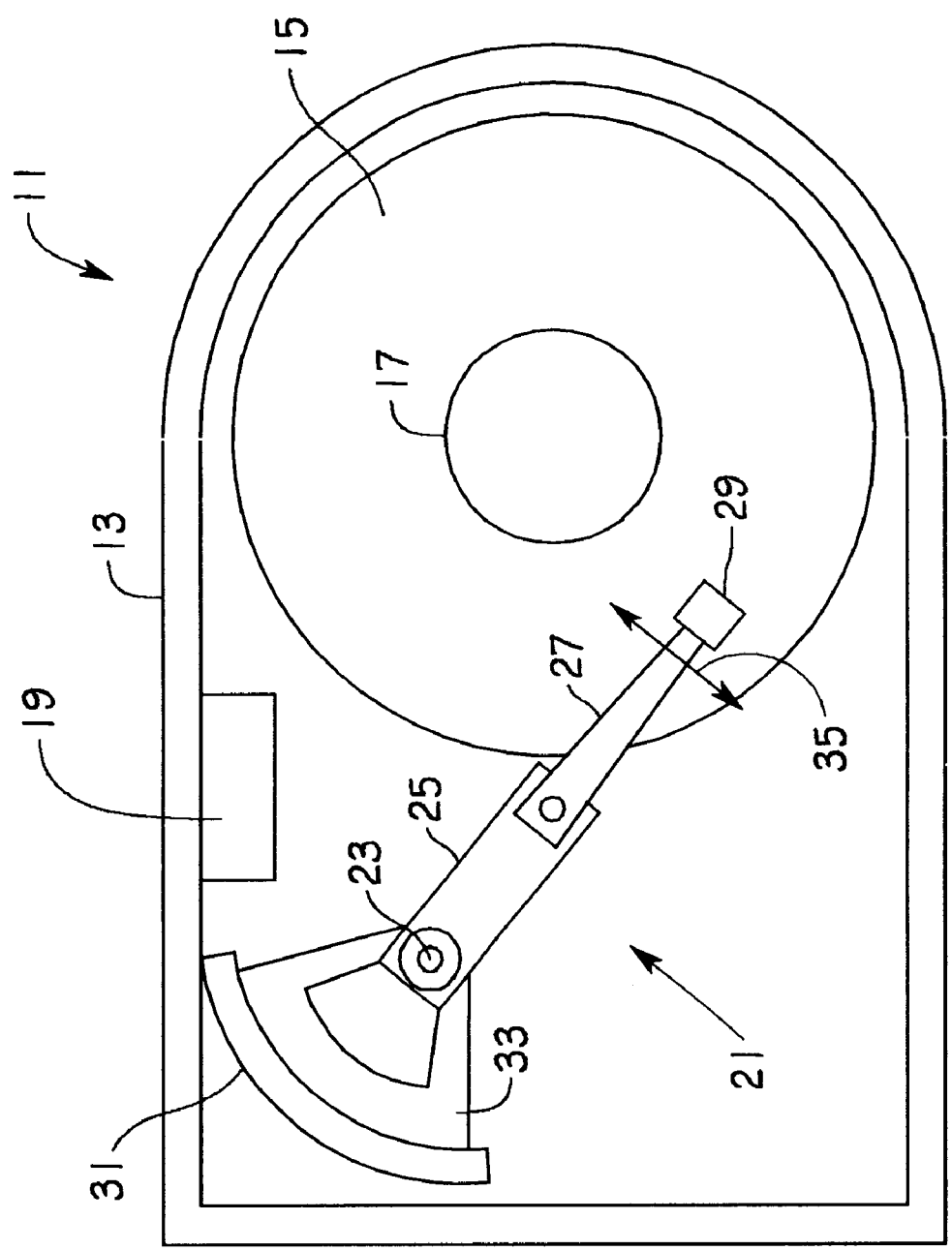
FIG. 1 is a schematic drawing of a hard disk drive having an actuator arm constructed in accordance with the invention.

Referring to FIG. 1, a schematic drawing of an information storage system comprising a magnetic hard disk file or drive 11 for a computer system is shown. Drive 11 has an outer housing or base 13 containing a plurality of stacked, parallel magnetic disks 15 (one shown) which are closely spaced apart. Disks 15 are rotated by a spindle motor located therebelow about a central drive hub 17. A plurality of parallel actuator arms 21 (one shown) are pivotally mounted to base 13 about a pivot assembly 23. A controller 19 is mounted to the base for selectively moving the cantilevered arms 21 relative to disks 15.

In the embodiment shown, each arm 21 comprises a mounting support 25, at least one (and preferably two) cantilevered load beam or suspension 27 extends from each mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and always move in unison with one another, unless drive 11 uses a split actuator (not shown) wherein the arms move independently of one another.

Referring now to FIG. 6, a first embodiment of the invention is depicted as mounting support 25a. Mounting support 25a is a two-piece design comprising a pair of support elements 41, 43 (FIGS. 2 and 4). Support elements 41, 43 share a number of virtually identical features including their overall dimensions, pivot mounting holes 45, 47 on their leftmost ends, and auxiliary holes 49, 51, respectively. However, support elements 41, 43 differ significantly on their rightmost ends.

Each support element 41, 43 has an interlock aperture 53, 55 and a tab 57, 59, respectively, that generally protrudes therein. Ideally, tabs 57, 59 are integrally formed from and consist of the same material as support elements 41, 43. In this version, aperture 53 is slightly smaller than aperture 55, and tab 57 extends outward and downward (FIG. 3), while tab 59 extends inward and upward (FIGS. 5 and 7). It should be apparent to those skilled in the art that apertures 53, 55 and tabs 57, 59 may be fabricated in many other shapes and sizes.

As shown in FIGS. 6 and 7, support element 41 mounts on top of support element 43 such that pivot mounting holes 45, 47 and auxiliary holes 49, 51 completely align. Pivot assembly 23 extends through and is closely received by mounting holes 45, 47 (see FIG. 1) to secure the leftmost ends of support elements 41, 43 relative to actuator arm 21 and each other. In addition, apertures 53, 55 substantially align along their common sides such that tabs 57, 59 precise engage each other longitudinally along their distal ends in a tight, interference fit. The interlocking tabs 57, 59 and tightly toleranced holes 45, 47 around pivot assembly 23, give the two-piece, assembled mounting support 25a enhanced bending, torsional stiffness, and shock resistance over prior art mounting supports. As described above for FIG. 1, at least one suspension 27 extends from each mounting support 25a, and a head gimbal assembly 29 is secured to each suspension 27 for magnetically reading data from or magnetically writing data to disks 15.

Figure 8:
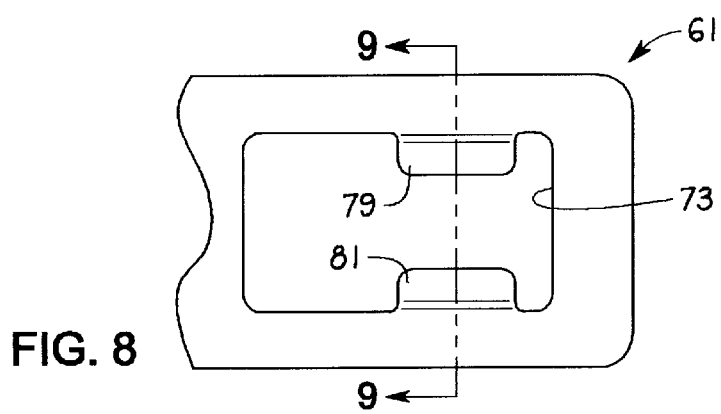
FIG. 8 is an enlarged plan view of a second embodiment of the first element of the arm of FIG. 1.
Figure 9:
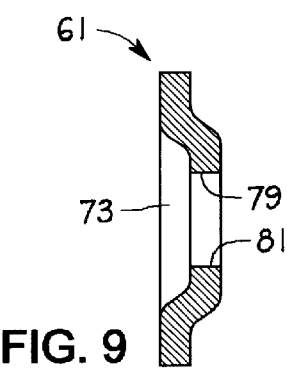
FIG. 9 is a sectional end view of the first element of FIG. 8 taken along the line 9—9 of FIG. 8.
Figure 10:
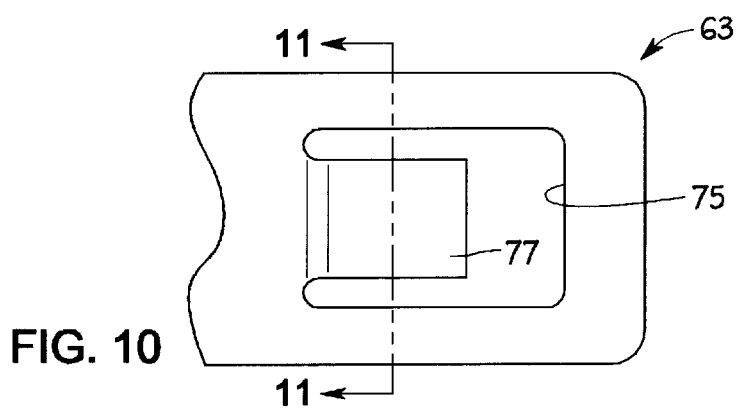
FIG. 10 is an enlarged plan view of a second embodiment of the second element of the arm of FIG. 1.
Figure 11:
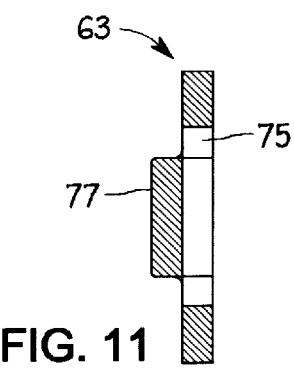
FIG. 11 is a sectional end view of the second element of FIG. 10 taken along the line 11—11 of FIG. 10.
Figure 12:
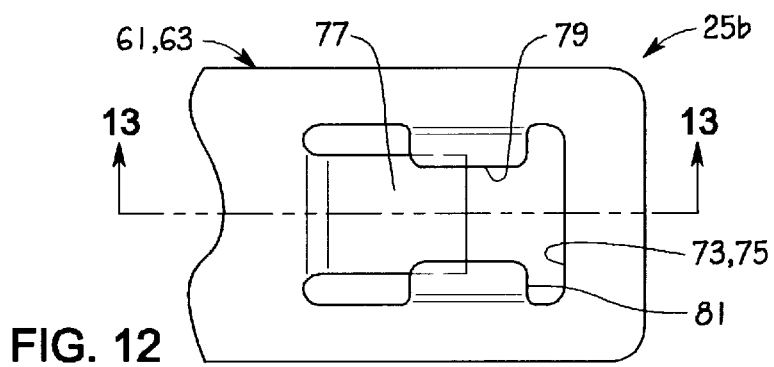
FIG. 12 is an enlarged plan view of an assembly of the first element of FIG. 8 and the second element of FIG. 10.
Figure 13:
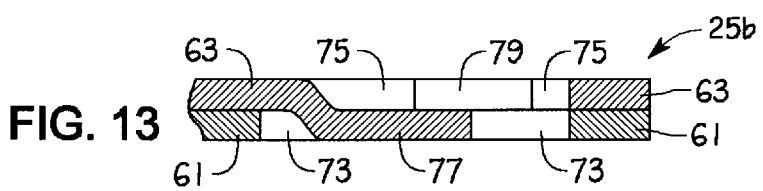
FIG. 13 is a sectional side view of the assembly of FIG. 12 taken along the line 13—13 of FIG. 12.

Referring now to FIGS. 12 and 13, a portion of a second embodiment of the invention is depicted as mounting support 25b. Like mounting support 25a, mounting support 25b is a two-piece design with a virtually identical pair of support elements 61, 63 (FIGS. 8 and 10). Support elements 61, 63 share common overall dimensions, pivot mounting holes, and auxiliary holes, and each has an interlock aperture 73, 75. Support element 63 has a single tab 77, and support element 61 has a pair of opposite facing tabs 79, 81 that protrude into their respective apertures 75, 73. Tabs 77, 79, 81 are integrally formed from their respective support elements 63, 61. In this embodiment, aperture 75 is slightly smaller than aperture 73, and tab 77 extends outward and downward (FIGS. 10 and 11), while tabs 79, 81 extend inward and upward (FIGS. 8 and 9).

As shown in FIGS. 12 and 13, support element 61 mounts on top of support element 63 such that their pivot mounting holes and auxiliary holes completely align. Pivot assembly 23 extends through and is closely received by the mounting holes as described above for the first embodiment. Apertures 73, 75 substantially align along their common sides such that tabs 77, 79, 81 precise engage each other laterally along their side edges in a tight, interference fit. The interlocking tabs 77, 79, 81 and tightly toleranced mounting holes around pivot assembly 23, give the two-piece, assembled mounting support 25b enhanced bending, torsional stiffness, and shock resistance. The assembly of actuator arm 21 with mounting support 25b is completed as described above for the first embodiment.

The present invention has advantages over prior art actuator arms. The latching or interlock devices described herein connect two independent actuator arm mounting support elements together such that the bending stiffness and shock resistance of the actuator arm assembly are improved significantly.

While the invention has been shown or described in only some of its forms, it should be apparent to those skilled in the art that it is not so limited, but is susceptible to various changes without departing from the scope of the invention.

What is claimed is:

1. A data access and storage device, comprising:

a base;

a disk rotatably mounted to the base;

an actuator movably mounted to the base;

an actuator arm extending from the actuator and having a head for reading data from and writing data to the disk; wherein the actuator arm comprises:

a first support element having a first interlocking device;

a second support element having a second interlocking device; wherein the first and second support elements are mounted to each other and secured from movement relative to each other via interconnection of the first and second interlocking devices; and wherein each of the interlocking devices comprises a tab, and wherein the tabs are joined by interference fit.

2. A data access and storage device, comprising:

a base;

a disk rotatably mounted to the base;

an actuator movably mounted to the base;

an actuator arm extending from the actuator and having a head for reading data from and writing data to the disk; wherein the actuator arm comprises:
- a first support element having a first interlocking device;
- a second support element having a second interlocking device; wherein
- the first and second support elements are mounted to each other and secured from movement relative to each other via interconnection of the first and second interlocking devices; and wherein
- the first interlocking device comprises a pair of opposed tabs and the second interlocking device comprises a single tab that engages the pair of opposed tabs via interference fit.

3. A hard disk drive, comprising:

a base having a spindle motor and a pivot assembly;

a plurality of disks rotatably mounted to the spindle motor;

an actuator pivotally mounted to the pivot assembly adjacent to the disks;

a plurality of actuator arms extending from the actuator, each having at least one suspension with at least one head for reading data from and writing data to respective ones of the disks; wherein each of the actuator arms comprises:
- a first support element having a first interlocking device and a proximal end with a first pivot mounting hole for closely receiving the pivot assembly;
- a second support element having a second interlocking device and a proximal end with a second pivot mounting hole for closely receiving the pivot assembly; wherein
- the first and second support elements are mounted to each other and to the pivot assembly, the first and second support elements being secured from movement relative to each other via interconnection of the first and second interlocking devices; and wherein
- each of the interlocking devices is located in an aperture in its respective support element.

4. The hard disk drive of claim 3 wherein the first support element is mounted on top of the second support element.

5. The hard disk drive of claim 3 wherein each of the interlocking devices is located on a distal end of its respective support element.

6. The hard disk drive of claim 3 wherein each of the interlocking devices comprises a tab, and wherein the tabs extend in opposite directions and are joined by interference fit.

7. The hard disk drive of claim 3 wherein the first interlocking device comprises a pair of opposed tabs and the second interlocking device comprises a single tab that engages the pair of opposed tabs via interference fit.

8. The hard disk drive of claim 3 wherein the support elements have identical overall dimensions.

9. A hard disk drive, comprising:

a base having a spindle motor and a pivot assembly;

a plurality of disks rotatably mounted to the spindle motor;

an actuator pivotally mounted to the pivot assembly adjacent to the disks;

a plurality of actuator arms extending from the actuator, each having at least one suspension with at least one head for reading data from and writing data to respective ones of the disks; wherein each of the actuator arms comprises:
- a first support element having a distal end with a first tab, and a proximal end with a first pivot mounting hole for closely receiving the pivot assembly;
- a second support element having a distal end with a second tab, and a proximal end with a second pivot mounting hole for closely receiving the pivot assembly; and wherein
- the first and second support elements are mounted to each other and to the pivot assembly, the first and second support elements being secured from movement relative to each other via interconnection of the first and second tabs.

10. The hard disk drive of claim 9 wherein the first support element is mounted on top of the second support element.

11. The hard disk drive of claim 9 wherein the tabs extend in opposite directions and are joined by interference fit.

12. The hard disk drive of claim 9 wherein the first tab comprises a pair of opposed tabs and the second tab comprises a single tab that engages the pair of opposed tabs via interference fit.

13. The hard disk drive of claim 9 wherein the support elements have identical overall dimensions.

* * * * *